United States Patent
Guo

(10) Patent No.: US 11,223,070 B2
(45) Date of Patent: Jan. 11, 2022

(54) FIBER-CONTAINING MATS WITH ADDITIVES FOR IMPROVED PERFORMANCE OF LEAD ACID BATTERIES

(71) Applicant: JOHNS MANVILLE, Denver, CO (US)

(72) Inventor: Zhihua Guo, Ottawa Hills, OH (US)

(73) Assignee: Johns Manville, Denver, CO (US)

( * ) Notice: Subject to any disclaimer, the term of this patent is extended or adjusted under 35 U.S.C. 154(b) by 159 days.

(21) Appl. No.: 16/575,516

(22) Filed: Sep. 19, 2019

(65) Prior Publication Data

US 2020/0014080 A1    Jan. 9, 2020

Related U.S. Application Data

(62) Division of application No. 15/812,393, filed on Nov. 14, 2017, now Pat. No. 10,483,597.

(51) Int. Cl.

| | |
|---|---|
| *H01M 10/42* | (2006.01) |
| *H01M 10/12* | (2006.01) |
| *H01M 4/38* | (2006.01) |
| *H01M 4/56* | (2006.01) |
| *H01M 4/14* | (2006.01) |
| *H01M 10/06* | (2006.01) |
| *H01M 50/44* | (2021.01) |

(Continued)

(52) U.S. Cl.
CPC ......... *H01M 10/4235* (2013.01); *H01M 4/14* (2013.01); *H01M 4/38* (2013.01); *H01M 4/56* (2013.01); *H01M 10/06* (2013.01); *H01M 10/12* (2013.01); *H01M 50/411* (2021.01); *H01M 50/431* (2021.01); *H01M 50/44* (2021.01)

(58) Field of Classification Search
None
See application file for complete search history.

(56) References Cited

U.S. PATENT DOCUMENTS

| | | |
|---|---|---|
| 6,733,547 B2 | 5/2004 | Ma |
| 9,683,085 B2 | 6/2017 | Zhang et al. |
| 2015/0099168 A1 | 4/2015 | Guo et al. |

(Continued)

FOREIGN PATENT DOCUMENTS

| | | |
|---|---|---|
| WO | 20150195742 A1 | 12/2015 |
| WO | 20150195743 A1 | 12/2015 |

(Continued)

OTHER PUBLICATIONS

Pankaj Arora and Zhengming (John) Zhang, Battery Separators, Chem. Rev. 2004, 104, 4419-4462, Celgard, LLC, Charlotte, North Carolina.

*Primary Examiner* — Daniel S Gatewood
(74) *Attorney, Agent, or Firm* — Robert D. Touslee

(57) ABSTRACT

Fiber-containing mats for lead acid batteries are described. The mats may include a plurality of fibers, a binder holding the plurality of fibers together, and one or more additives incorporated into the mat, where the additives may include one or more compounds selected from benzyl benzoate and a glycol ester. Additional fiber-containing mats include a plurality of woven or non-woven fibers and the one or more additives. The fiber-containing mats having the one or more additives may be used in lead-acid batteries that include a positive and negative electrode, a separator, and one or more pasting mats.

29 Claims, 9 Drawing Sheets

(51) Int. Cl.
*H01M 50/411* (2021.01)
*H01M 50/431* (2021.01)

(56) References Cited

U.S. PATENT DOCUMENTS

2016/0268566 A1* 9/2016 Dietz, III ............... B29C 70/88
2016/0315327 A1 10/2016 Ketzer et al.

FOREIGN PATENT DOCUMENTS

| WO | WO-2015195742 A1 * | 12/2015 | ............ H01M 4/38 |
| WO | WO-2017138038 A1 * | 8/2017 | ............ H01M 10/08 |

* cited by examiner

FIBER-CONTAINING MATS WITH ADDITIVES FOR IMPROVED PERFORMANCE OF LEAD ACID BATTERIES

CROSS REFERENCE TO RELATED APPLICATIONS

This application is a divisional of pending U.S. application Ser. No. 15/812,393, filed Nov. 14, 2017

BACKGROUND OF THE INVENTION

Lead acid batteries were first developed more than 150 years ago, and are recognized as the first rechargeable battery. Despite the development of many other battery technologies over the past 150 years, lead acid batteries still enjoy wide use today in a number of industries, especially for automobile starting, lighting and ignition (SLI) applications. While lead acid batteries have a relatively low energy-to-weight and energy-to-volume ratio compared to other types of battery systems, their ability to supply large amounts of current in short bursts give them one of the highest power-to-weight ratios of any battery system. The ability of lead-acid batteries to deliver high amounts of surge current to components like automobile starter motors have kept them an important part of the battery industry for many decades.

Lead acid batteries are also unusual among battery systems for using the same element, lead (having chemical symbol Pb), as the electro-active material in both the positive and negative electrodes of the battery. You can see an illustration of this in FIGS. 1A and 1B, which show diagrams of the chemical reactions taking place during the charging and discharging of a lead acid battery that uses an aqueous sulfuric acid solution as the electrolyte. The use of lead in both the positive and negative electrodes is possible because the lead compounds have different oxidation states in each electrode.

The negative electrode includes lead metal, Pb(s), in the zero oxidation state ($Pb^0$) that is oxidized to $Pb^{2+}$ when the battery is discharged. In contrast, the positive electrode includes lead oxide, $PbO_2$(s), in the plus-four oxidation state ($Pb^{4+}$) that is reduced to the same $Pb^{2+}$ during battery discharge. The electrolyte in lead-acid batteries is aqueous sulfuric acid [$H_2SO_4$ (aq)], and the sulfate ions ($SO_4^{2-}$) in the electrolyte counterbalance the $Pb^{2+}$ ions formed during discharge at both the negative and positive electrodes to make solid lead sulfate ($PbSO_4$(s)). The conversion of Pb(s) to $PbSO_4$(s) at the negative electrode and the complementary conversion of $PbO_2$ to $PbSO_4$(s) at the positive electrode are reversed when a recharging current is supplied to the lead-acid battery, for example through the alternator of an automobile. The complete half reactions for the positive and negative electrodes can be written as follows:

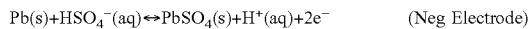

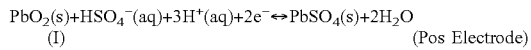

Unfortunately, the electrode half reactions shown above are not the only reactions that can occur in a lead-acid battery: When a lead acid battery is charged too quickly, or continues to be charged at too high a voltage after reaching full charge, the electric current changes from (i) electrolyzing the lead sulfate back into lead (Pb(s)) and lead oxide ($PbO_2$(s)) to (ii) hydrolyzing the water in the electrolyte to hydrogen ($H_2$(g)) and oxygen ($O_2$(g)) gas. Not only does this reduce the amount of water present in the electrolyte, it also causes the buildup of an explosive gas mixture within the battery. If the gases are vented without replenishing the water, the battery could run dry resulting in the electrodes being permanently damaged or destroyed. Even worse, if the gases are not vented quickly enough to prevent a buildup of pressure, the pressurized hydrogen and oxygen gases could explode.

Another undesired reaction is the irreversible formation of large lead sulfate crystals on the electrodes in a process known as sulfation. These larger crystals of lead sulfate act as electrical insulators that attenuate and eventually stop electrical conduction though the battery's electrodes. Sulfation is most prevalent in batteries that are undercharged or slowly charged to give fine particles of lead sulfate a chance to act as seed crystals for the growth of larger lead sulfate crystals that cannot be eliminated by applying more charge. It is the most common cause of premature lead acid battery failure.

Lead acid battery developers have incorporated additives into the electrolyte solution that suppress the electrolysis of water from the electrolyte and the formation of large lead sulfate crystals on the electrodes. These additives have been shown to reduce maintenance costs and extend the lifetime of lead acid batteries. However, many of the additives themselves have lifetimes significantly shorter than the battery due in part to the highly reactive and corrosive environment of a concentrated sulfuric acid solution. Thus there is a need to develop new additives that are stable for extended periods of time in the difficult environment of a lead acid battery. There is also a need to develop new materials and methods that can introduce the additives to the electrolyte over an extended period of time. These and other challenges are addressed in the present application.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

BRIEF SUMMARY OF THE INVENTION

Figure 1A:
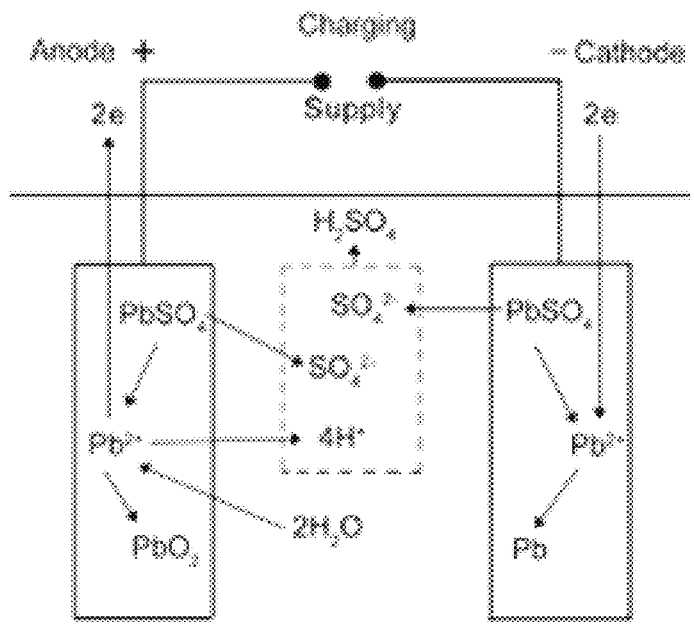
FIG. 1A is a diagram of the chemical reactions that take place in a lead-acid battery during electrical charging.
Figure 1B:
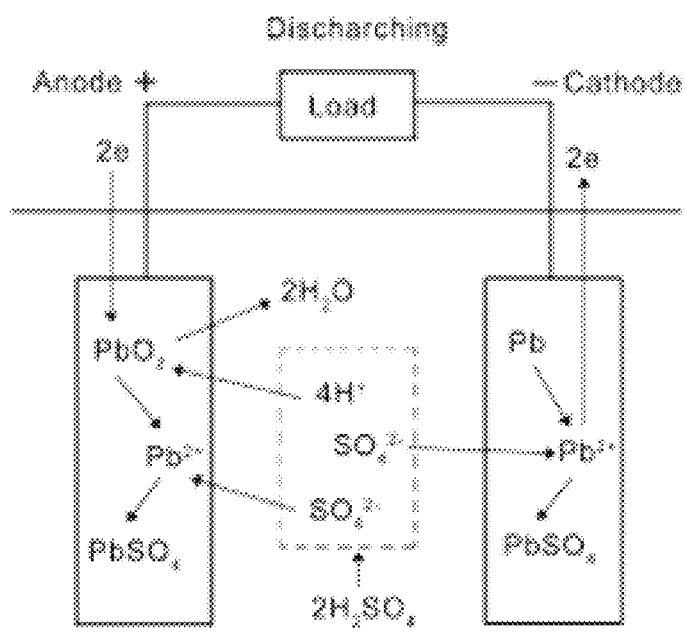
FIG. 1B is a diagram of the chemical reactions that take place in a lead-acid battery during electrical discharging.

Fiber mats are described that incorporate one or more additives to extend the operational performance and lifetime of lead acid batteries. The additives may be incorporated directly onto fibers that make up the mat, included in binder compositions that form a cured binder to hold together the fibers in the mat, or both. The incorporation of the additives into the fiber mats permits them to be released over time into the battery's electrolyte. The mat acts as a replenishing source of the additives for the electrolyte, keeping them at a higher level than if all the additives were originally dissolved in the electrolyte.

Some additives have been identified as being especially well suited for incorporation in the fiber mats: Benzyl benzoate is an aromatic ester that inhibits the crystallization of lead sulfate, and is therefore an effective sulfation inhibitor in lead acid batteries. In addition, benzyl benzoate can suppress the evolution of hydrogen and oxygen. Unfortunately, the ester bond in benzyl benzoate is prone to hydrolysis in the highly acidic environment of a sulfuric acid electrolyte solution. This makes benzyl benzoate a poor choice of additive for direct addition to a lead acid battery electrolyte because its concentration drops below a level needed to act as an effective sulfation inhibitor well before the expected expiration date of the battery. Incorporation of benzyl benzoate into a mat that makes contact with the electrolyte allows its replenishment in the electrolyte over a significantly longer duration of the battery's operation.

Another class of additives that is well suited for incorporation in the fiber mats is glycol esters. These esters inhibit the growth of lead sulfate crystals as well as suppressing the generation of hydrogen and oxygen gas from the electrolysis of water in the electrolyte. Because they are esters however, they are prone to ester hydrolysis in the highly acidic environment of the sulfuric acid electrolyte and tend to have short lifetimes when added directly to the electrolyte. Incorporation of one or more types of glycol esters into a mat that makes contact with the electrolyte allows their replenishment in the electrolyte over a significantly longer duration of the battery's operation.

The additive-containing mats may be used in a variety of lead acid battery components. Examples of these components include the separator that electrically insulates the positive and negative electrodes of the battery while permitting the migration of the balancing ions (e.g., sulfate and bisulfate ions) in the electrolyte. The mat may also be used as a retainer/support mat for a separator made of different materials (e.g., a porous membrane). The mat may further be used as a pasting mat for a positive and/or negative electrode of the battery. The additive-containing mats may be used in one or more components of the battery that use fiber-containing mats.

Embodiments of the invention include fiber-containing mats for lead acid batteries. Each mat may include a plurality of fibers, and a binder that holds the plurality of fibers together in the fiber-containing mat. One or more additives are incorporated into the fiber-containing mat, and the additives are selected from the group consisting of benzyl benzoate and a glycol ester.

Additional embodiments of fiber-containing mats for lead acid batteries may include a plurality of woven or non-woven fibers and one or more additives incorporated into the mats. The additives may be selected from the group consisting of benzyl benzoate and a glycol ester. The one or more additives may be incorporated directly onto the fibers, for example by spraying or applying them with an additive-containing sizing composition. If the plurality of fibers are being held together by a binder, the one or more additives may be present in the binder as an alternative or complement to incorporating additive directly on the fibers.

Embodiments of the invention may also include lead acid batteries that use one or more of the present mats. An exemplary lead acid battery may include a positive electrode comprising lead oxide and a negative electrode comprising a lead alloy. The battery may also include a separator that electrically insulates the negative electrode from the positive electrode. The battery may further include one or more pasting mats in contact with at least one of (i) the positive electrode and (ii) the negative electrode. The battery may still further include one or more additives selected from the group consisting of benzyl benzoate and a glycol ester. The one or more additives may be incorporated into a fiber-containing mat present in the lead acid battery. For example, the additives may be incorporated into one or more of the pasting mats. If the separator includes a fiber-containing mat, then the one or more additives may be incorporated into the separator. If the battery includes a fiber-containing retainer/support mat in contact with the separator, the one or more additives may be incorporated into the retainer/support mat. If the lead acid battery includes more than one fiber-containing mat, the one or more additives may be incorporated into a single mat, more than one mat, or all the mats, depending on the desired concentration and distribution of the additives in the battery.

Embodiments may also include methods of making a fiber-containing mat that incorporates one or more of the additives. The methods may include providing a plurality of fibers and applying a binder composition to the fibers. In some embodiments of the method, one or more additives may be incorporated onto the fibers. In additional embodiments, the one or more additives may be incorporated into the binder composition. In still more embodiments of the method, the one or more additives may be incorporated into both the plurality of fibers and the binder composition. There are also embodiments where at least one additive is incorporated into the plurality of fibers and at least a second additive—different from the first additive—is incorporated into the binder composition. The methods of making the fiber-containing mats may also include curing the combination of the plurality of fibers and binder composition to form a mat of the fibers and cured binder. The methods may further include cutting, shaping, and/or stitching the mats to make the final form of the fiber-containing mat. Some embodiments may also involve applying an additive to the mat after it has been processed into its final form.

Embodiments may still further include methods of making a lead acid battery that includes one or more fiber-containing mats that incorporate one or more of the additives. The methods may include contacting at least one of the fiber-containing mats with one or more components of the battery, such as an electrode and/or a separator (when the separator is not made from the fiber-containing mat). In some embodiments, a single fiber-containing mat that incorporates the one or more additives may be added to the battery, while in additional embodiments two or more mats may be added to the battery.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Fiber-containing mats that incorporate one or more additives to improve the operational performance and lifetime of a lead acid battery are described. The additives may include organic esters that are prone to rapidly hydrolyzing in the highly acidic environment of a sulfuric acid electrolyte used in the battery. The additives, which may include benzyl benzoate and glycol esters, improve the performance and lifetime of the battery by inhibiting sulfation and/or suppressing the generation of hydrogen and oxygen gas from the electrolysis of water in the electrolyte, among other benefits. By incorporating the additives in the fiber mats instead of adding them exclusively to the sulfuric acid electrolyte, they can be maintained at sufficient concentrations in the electrolyte over a longer period, in some instances even the lifetime of the battery.

The one or more additives may be incorporated into the fiber-containing mat by applying them directly to the fibers in the mat, adding them to the binder compositions used to make the mat, or both. One or more additives may be applied directly to the fibers by adding the additives to a sizing composition that is used to size the fibers. As the fibers make contact with the sizing composition, the one or more additives may be absorbed onto the exposed surfaces of the fibers. The sizing composition may be applied to fibers by spraying, dip coating, or curtain coating, among other contacting processes. Alternatively, or in addition, the one or more additives may be added to a binder composition that is used to hold together the fibers and maintain the shape of the mat. The binder composition may be applied to the fibers by spraying, dip coating, or curtain coating, among other application processes. The amalgam of the fibers and the binder composition may then be cured to form the final fiber-containing mat.

The fiber-containing mats with the incorporated additives may be used in a variety of components of a lead acid battery. For example, the fiber-containing mats may be used as a pasting mat that helps contain an electrode active paste in a battery electrode. The materials used to make the fibers of the mat, as well as the compounds chosen for the additives, may be selected based on the composition of the electrode active paste. For example, a pasting mat that contacts a lead-oxide-containing positive electrode active paste in a positive electrode may use a different type and/or amount of additive than a pasting mat that contacts a lead-alloy-containing negative electrode active paste in a negative electrode. In additional examples, such as when the lead-acid battery is an absorbent-glass-mat battery, the fiber-containing mats incorporated with the additives may be separators that electrically insulate the battery electrodes while permitting the migration of sulfur-containing ions (e.g., sulfate ions) in the electrolyte between the electrodes. In still further examples, the fiber-containing mats incorporated with the additives may be retainer/support mats that provide support and/or backing for another battery component. For example, in flooded lead acid batteries the separator may be a porous membrane that doesn't have enough rigidity to maintain a constant barrier between opposite electrodes. The present retainer/support mats can act as a backing for the membrane so that it maintains a fixed position between the electrodes in the electrolyte solution.

The fiber-containing mats with the incorporated additives can be used in one or more components of the lead-acid battery. Embodiments include using a single fiber-containing mat with one or more of the incorporated additives in a lead acid battery, for example as a pasting mat for one of the electrodes, as the separator, or as a retainer/support mat. Embodiments further include using two fiber-containing mats with one or more of the incorporated additives in the battery, for example, as pasting mats for each of the electrodes. Embodiments still further include using three or more fiber-containing mats with one or more incorporated additives in the battery, for example as pasting mats for each of the electrodes as well as a separator or retainer/support mat.

Exemplary Pasting Mats

Figure 2:
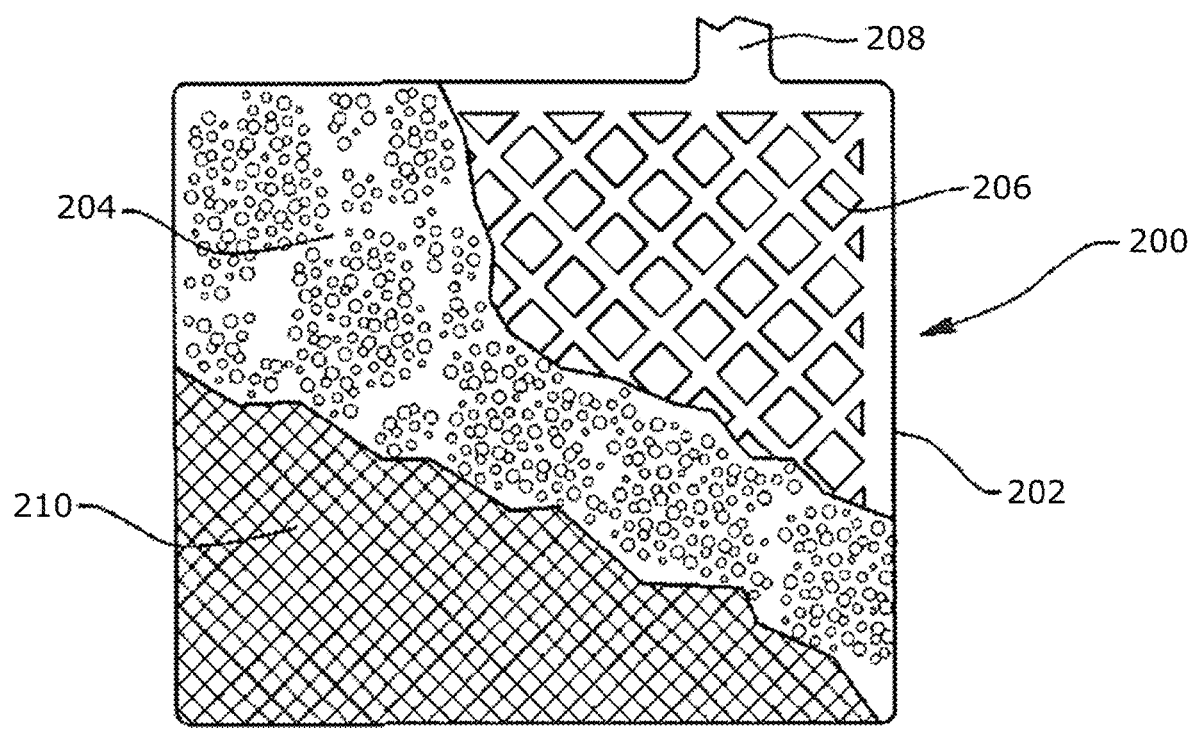
FIG. 2 is a simplified schematic of an electrode plate and pasting mat according to embodiments of the invention.

FIG. 2 shows a simplified cut-away schematic of an electrode 200 for a lead acid battery. The electrode includes a grid structure 202 that permits the conduction of electrons to and from an electrode active material 204. The grid structure 202 may be made from rods or strips of conductive materials such as lead alloys. Exemplary lead alloys include lead alloyed with one or more metals selected from antimony, calcium, and selenium, among other metals. For example the grid structure 202 may be made from a lead-antimony-calcium alloy. The grid structure 202 includes a tab 208 that can be electrically coupled to an external terminal of the battery, and a number of openings 206 between the grid lines. The openings 206 can be filled with the electrode active material 204 to increase the contact between the material and the grid structure 202. The electrode active material 204 may be covered with a pasting mat 210.

The pasting mat 210 may be made from the present fiber-containing mats that include one or more additives. Exemplary fibers used in the pasting mat may be one or more types of fibers selected from glass fibers, mineral fibers, carbon fibers, and organic polymer fibers, among other types of fibers. Exemplary organic polymer fiber can include one or more of polyester fibers, polyolefin fibers, nylon fibers, aramid fibers, poly(phenylene sulfide) fibers, and polyethylene terephthalate fibers, among other types of organic polymer fibers. The fibers may have an average fiber diameter ranging from 0.1 μm to 50 μm, and an average fiber length ranging from 0.1 mm to 25 cm (e.g., 1.5 mm to 60 mm; 3 mm to 25 mm; and 0.5 mm to 7 mm; among other exemplary length ranges).

The one or more additives may be incorporated directly onto the fibers of the pasting mat, incorporated into the binder that holds together the fibers in the mat, or both. When the additives are incorporated directly onto the fibers, they may be placed there by a sizing composition containing the additives that is used to size the fibers. When the additives are incorporated into the binder, they may be placed there by a binder composition that is applied to the fibers and cured to form the mat of fibers held together by the binder. Exemplary binder compositions used to make the pasting mat include acrylic binder compositions, styrene acrylonitrile binder compositions, styrene butadiene rubber binder compositions, urea formaldehyde binder compositions, epoxy binder compositions, polyurethane binder compositions, phenolic binder compositions, and polyester binder compositions.

The one or more additives may include organic esters such as benzyl benzoate and glycol esters. Benzyl benzoate inhibits sulfation when used as an additive in the paste of the lead acid battery. It also suppresses the evolution of hydrogen from the hydrolysis of water. Benzyl benzoate has a high boiling point (323° C.) relative to water.

Because the glass mat components of lead acid batteries are typically cured at temperatures below 200° C., little benzyl benzoate is lost through evaporation during the curing and drying of the binder in the glass mat. Benzyl benzoate is not soluble in water, but can be incorporated into an aqueous binder composition (e.g., an acrylic binder composition) as an emulsion.

Glycol esters also suppress hydrogen evolution from the hydrolysis of water. Specific glycol esters can be selected that have a higher boiling point than water and that are compatible with the polymers of the binder (e.g., acrylic polymers). Exemplary glycol esters include commercially available TegMeR 812. As noted above, the organic esters may be added directly to the binder composition or applied directly to the fibers through a sizing composition. In some embodiments, the organic esters may be incorporated in both the binder composition and a sizing composition for the fibers.

The composition of the electrode active material 204 varies depending on whether the electrode 200 is a positive electrode or a negative electrode. Both electrodes may be made by applying a wet paste of an electrode active material to the grid structure 202 followed by curing and drying the paste. In some embodiments, the pasting mat is placed on the wet paste to facilitate the removal of water from the paste during drying. In additional embodiments, the pasting mat is placed on the electrode active material after it has been cured and dried.

The paste of electrode active material may be made by milling and oxidizing lead metal (Pb) into oxidized lead powder, referred to as "leady-lead oxide", that includes remnants of the lead metal (e.g., 20-30 wt. % Pb), and lead oxide (e.g., 70-80 wt. % lead oxide). The lead oxide may include lead in one or more degrees of lead oxidation, including lead monoxide (PbO), lead dioxide ($PbO_2$), and lead tetraoxide ($Pb_3O_4$). The leady-lead oxide is then formed into a slurry by mixing with water and sulfuric acid. The sulfuric acid converts a portion of the lead and lead oxides into lead sulfates that may include one or more of monobasic lead sulfate ($PbOPbSO_4$), tribasic lead sulfate ($3PbOPbSO_4.H_2O$), and tetrabasic lead sulfate ($4PbOPbSO_4$).

The sulfated lead oxide slurry can be differentiated into positive and negative electrode active materials by varying the curing and drying conditions after a paste of the material has been applied to the electrode's grid structure 202. For example, the positive electrode active material pasted onto the positive grid structure of the electrode may be cured under elevated temperature conditions in the presence of steam to form a combination of lead oxides and lead sulfates that more readily form lead dioxide ($PbO_2$) when the lead acid battery is charged. On the other hand, the negative electrode active material pasted onto the negative grid structure of the electrode is cured at room temperature in the absence of steam to form a combination of lead oxides and lead sulfates that more readily form lead metal (e.g., spongy lead) when the lead acid battery is charged.

The negative electrode active material may also include an expander added to the slurry that promotes the formation of high-surface area spongy lead when the lead acid battery is charged. The expander may include carbon black, barium sulfate ($BaSO_4$), and a lignosulfonate. Expanders are generally added in a range of 0.5% to 1.5% of the weight of the lead components of the negative electrode active material (e.g., 1 wt %). In further embodiments, the negative electrode active material may include a polymer that slows the shrinkage of the material and the disintegration of the negative electrode. Exemplary polymers may include polymerized alcohols (e.g., polyvinyl alcohol) and polyvinylpyrrolidone. When the polymer is electrically insulating, additional conductive material such as carbon black, graphite, and/or carbon nanotubes, may be added to make the negative electrode active material more electrically conductive. The polymer is generally added in a range of 0.01% to 2% of the weight of the lead components of the negative electrode active material.

In some embodiments reinforcing fibers may be incorporated into the slurry of the electrode active material. Exemplary fibers may include one or more of glass fibers, mineral fibers, carbon fibers and polymer fibers. The polymer fibers may include one or more of polyester fibers, polypropylene fibers, acrylic fibers, and modacrylic fibers. Exemplary lengths of the fibers range from 1 to 6 mm.

Figure 3A:
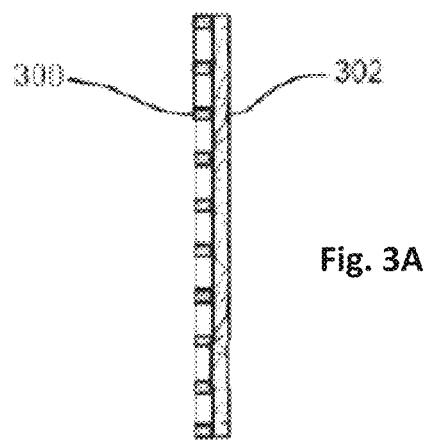
FIGS. 3A-C are simplified cross-sectional views of an electrode plate and one or more pasting mats according to embodiments of the invention.
Figure 3B:
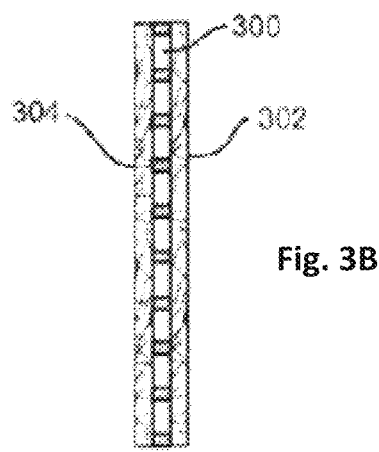
Figure 3C:
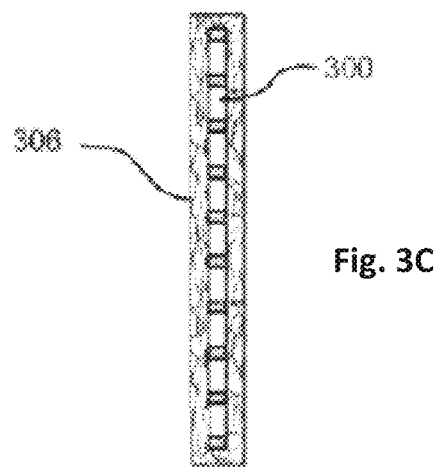

As shown in FIGS. 3A-3C, pasting mats may be attached to the battery electrodes in a number of ways. FIG. 3A shows a single pasting mat 302 attached to an electrode grid structure 300 that has pasted with electrode active material. FIG. 3B shows a first pasting mat 302 and a second pasting mat 304 attached on opposite sides of the electrode grid structure 300. FIG. 3C shows a pasting mat 306 in the shape of a pocket that envelops a plurality of the sides and edges of the electrode grid structure 300.

The pasting mats 302, 304, and 306 illustrated in FIGS. 3A-3C may be made from the same fiber-containing mat material containing one or more additives described above. In additional embodiments the pasting mats 304 and 306 attached to opposite sides of the electrode grid structure 300 in FIG. 3B may be made from different fiber-containing mats. The differences between the pasting mats 304 and 306 may include differences in the composition of the fibers used to make the mats and/or differences in the one or more additives incorporated into the mats. For example, when one of the pasting mats (e.g., pasting mat 304) is in direct contact with a separator (not shown) made from a fiber-containing mat that incorporates one or more additives, then the pasting mat itself may use less or none of those additives. However, the opposite mat (e.g., pasting mat 306) that is not in direct contact with a separator can be made with a fiber-containing mat having higher concentrations of the one or more additives.

Because the pasting mats 302, 304, and 306 make direct contact with an electrode grid structure 300 that has pasted with and electrode active material, they may incorporate components to make them more electrically conductive. Examples of conductive materials incorporated into the pasting mats 302, 304, and 306 include one or more of graphite fibers, graphite particles, carbon black, and metal fibers and/or particles that are galvanically compatible with the lead-containing materials in the electrode grid structure 300 and electrode active materials.

Exemplary Separators and Retainer/Support Mats

The present fiber-containing mats that incorporate one or more additives may be used as separators and retainer/support mats in lead acid batteries. Embodiments where the fiber-containing mat is used as a separator include AGM lead-acid batteries where the aqueous sulfuric acid electrolyte is absorbed into the separator. In these embodiments, the separator's fibers are in direct contact with both the positive and negative electrodes to permit migration of the sulfur-containing ions (e.g., sulfate and bisulfate ions) from one electrode to the other through the electrolyte absorbed on the fibers.

Alternatively, embodiments wherein the fiber-containing mat is used as a retainer/support mat include flooded lead-acid batteries where the mat makes contact with a separator that may be made from a sheet or envelope of microporous material. Exemplary materials used to make flooded lead-acid battery separators include one or more of paper, rubber, and/or organic polymer. Examples of paper separators include cellulosic fibers such as cotton fibers and craft paper pulp. In many instances the paper is coated with an acid-resistant resin (e.g., a phenolic resin). Examples of rubber separators include hard rubbers made by vulcanizing natural rubber and mixing it with hard particulates such as silica, and flexible rubbers made by exposing natural rubber to crosslinking conditions (e.g., irradiation with UV light) and optionally adding a small amount of particulates such as silica. Examples of organic polymer separators include polyvinyl chloride and polyethylene. The organic polymers may also be mixed with hard particles (e.g., silica particles) to give them an average diameter pore size of 1 to 20 µm (e.g., 10 to 20 µm).

The retainer/support mat normally has the same or greater porosity as the separator to permit the flow of sulfur-containing ions through the mat and separator between the electrodes of the flooded lead-acid battery. The varieties of materials, additives and properties of the present fiber-containing mats may be the same for both the separators and retainer support/mats discussed below.

Figure 4A:
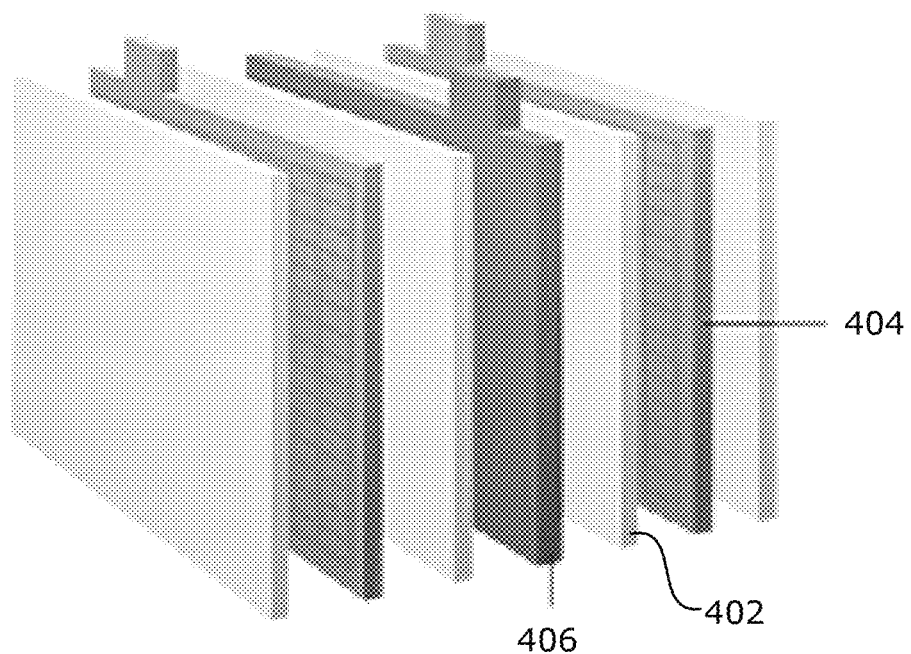
FIG. 4A is a simplified schematic of a separator sandwiched between an positive and negative electrode according to embodiments of the invention.
Figure 4B:
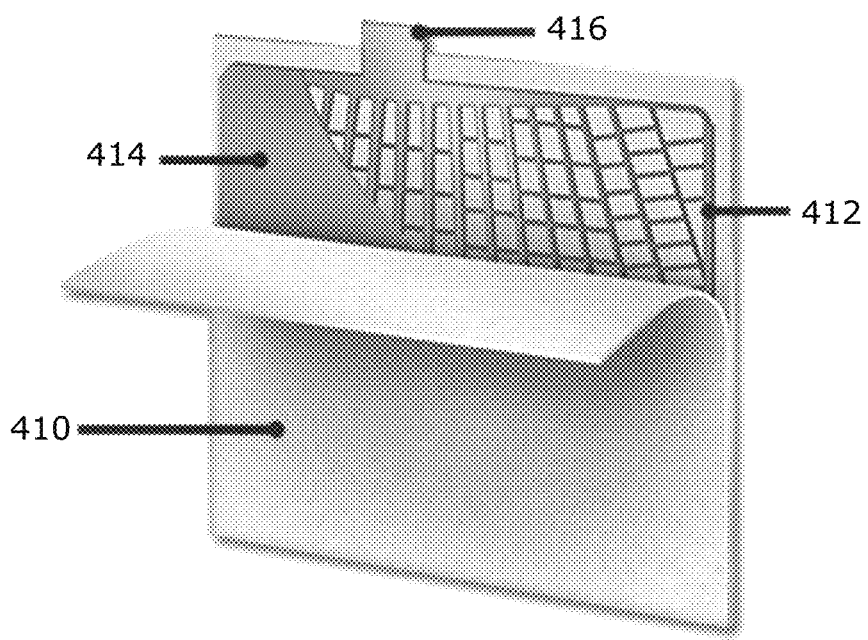
FIG. 4B is a simplified schematic of a separator enveloping an electrode according to embodiments of the invention.

FIGS. 4A and 4B show examples of lead acid battery separators made from the present fiber-containing mats according to embodiments of the invention. These separators may be used in AGM lead acid batteries. FIG. 4A shows an example of a separator 402 that is formed as a single sheet (also called a leaf) sandwiched between positive electrode 404 and negative electrode 406. The separator 402 may be made from a fiber-containing mat that includes one or more additives. As noted above, the additives may include benzyl benzoate and glycol esters that improve the performance and lifetime of a lead-acid battery by inhibiting sulfation and/or suppressing the generation of hydrogen and oxygen gas from the electrolysis of water in the battery's sulfuric acid-containing electrolyte. The one or more additives may make up 0.01 wt. % to 5 wt. % based on the weight of the separator 402.

The one or more additives may be incorporated into the separator 402 by applying them directly to the fibers of the separator, adding them to the binder compositions used to make the separator, or both. One or more additives may be applied directly to the fibers of the separator 402 by adding the additives to a sizing composition that is used to size the fibers. As the fibers make contact with the sizing composition, the one or more additives may be absorbed onto the exposed surfaces of the fibers. Alternatively, or in addition, the one or more additives may be added to a binder composition that, when cured, becomes the binder that holds together the fibers and maintain the shape of the separator 402. For example, in an AGM separator that has little or no binder, the additive may be added to the mat through the process water used to disperse the glass microfibers. Alternatively, the additive may be applied on the AGM separator as a final manufacturing step.

The separator 402 has a thickness that prevents positive and negative electrodes 404 and 406 from making electrical contact that would short out the lead acid battery. Exemplary mat thickness ranges between 0.5 mm to 3.0 mm when compressed under a pressure of 10 kPa. The area weight of the separator 402 generally ranges from 100 and 400 g/m$^2$ (e.g., 150 and 300 g/m$^2$).

The separator 402 should be sufficiently electrically insulating to prevent significant electron conductance between the positive and negative electrodes 404 and 406. Electrical resistivity on the order of about 1 MΩ per square or more is usually sufficient. While the separator 402 is electrically insulating, it should also be conductive to the ions in the electrolyte (e.g., $SO_4^{2-}$ ions) that form the complementary ionic current to the electric current traveling between the positive and negative electrodes 404 and 406. The separator 402 may be porous to permit this ionic migration, and can have a porosity of 50% to 99%. In exemplary separators 402, the average pore diameter of the ion channels formed in the separator can range from 0.01 µm to 5 mm. For example, when separator 402 is used as an AGM separator, it may have an average pore diameter ranging from 0.01 µm to 100 µm.

The fiber-containing mat used to make separator 402 may include one or more types of fibers that include glass fibers, mineral fibers, carbon fibers, and organic polymer fibers, among other types of fibers. When the separator 402 includes glass fibers, the glass-fibers may be made from T-glass, 253-glass, and C-glass, among other types of acid-resistant glass. The glass fibers may include one or both of coarse glass fibers and glass microfibers. Exemplary diameters for coarse glass fibers range from 8 to 30 µm, and exemplary diameters for glass microfibers range from 0.01 to 5 µm. When the separator 402 includes blends of both coarse glass fibers and glass microfibers, the blends may have 40 wt. % to 80 wt. % coarse fibers and 20 wt. % to 60 wt. % glass microfibers based on the total weight of the glass fibers. In additional examples (e.g., AGM separators), the glass microfibers may be greater than 80 wt. % based on the total weight of the glass fibers.

The glass fibers in separator 402 may be held together with a binder made from a cured binder composition. Exemplary binder compositions may include a substituted or unsubstituted acrylic acid or a substituted or unsubstituted acrylic ester. For example, the substituted or unsubstituted acrylic ester may include one or more of methyl methacrylate and ethyl acrylate, among other alkyl acrylates (e.g., a combination of methyl methacrylate and ethyl acrylate). The binder composition may further include acrylamide compounds such as methyl acrylamide. Examples of the substituted or unsubstituted acrylic ester further include at least two substituted or unsubstituted acrylic esters, where the esters form an acrylic ester copolymer. Some of these binder compositions are commercially sold under the tradename Rhoplex® by Dow Chemical Company (e.g., Rhoplex® HA-16), and Hycar® by Lubrizol Corporation (e.g., Hycar® 26-0688). The separator 402 may include 5 wt. % to 30 wt. % of binder and 70 wt. % to 95 wt. % of fibers. In some examples (e.g., AGM separators), the separator 402 may lack binder in order to increase its wettability.

When the separator 402 includes organic polymer fibers, those fibers may include one or more types of polymer fibers selected from polyethylene terephthalate ("PET"), polybutylene terephthalate ("PBT"), polypropylene ("PP"), polyethylene ("PE"), and poly(p-phenylene sulfide) ("PPS"). The polymeric fibers used in separator 402 may have exemplary fiber diameters ranging from 0.01 µm to 100 µm, and exemplary fiber lengths ranging from 0.3 inches to 1.5 inches. For example, the polymeric fibers may have an average length of 1.25 inches, while in other examples shorter polymeric fibers having lengths of 0.5 inches to 0.75 inches are used in the separator 402.

In some embodiments, at least one additional glass non-woven mat may be attached to the separator 402 to change the electrical conductivity of the pair. The additional glass non-woven mat may include one or more types of electrically conductive materials that alter its electrical conductivity. Examples of these electrically conductive materials include graphite fibers, for example, normally have a higher electrical conductivity (lower electrical resistance) than more electrically insulating glass and organic polymeric fibers. Thus, adding graphite fibers to the additional non-woven mat makes separator/glass mat pair more electrically conductive. In addition to (or in lieu of) the graphite fibers, other fibers with increased electrical conductivity may be added to the additional glass non-woven mat to alter the electrically conductivity of the separator/glass mat pair. These conductive fibers may include conductive organic polymers (e.g., polyanilines), graphene, carbon nanofibers, carbon nanotubes, and carbon nanostructures (CNS), among others.

In addition to the above described one or more additives, a hydrophilic agent may be incorporated into separator 402 to increase the affinity of the separator for the aqueous electrolyte. Exemplary hydrophilic agents may include (i) a surfactant and/or (ii) a hydrophilic carboxyl-containing compound. Exemplary surfactants may include ionic and nonionic surfactants. Exemplary ionic surfactants may include nitrogen-containing cationic surfactants, such as quaternary ammonium compounds (e.g., salts that include halogen anions coupled with a quaternary ammonium cation). One example of a quaternary ammonium compound that may act as a hydrophilic agent is stearyl dimethyl benzyl ammonium chloride, which is a component of a commercial surfactant formulation tradenamed Carsoquat® SDQ-25 sold by Lonza, Inc. Exemplary non-ionic surfactants include alcohol ethoxylates. One example of alcohol ethoxylates are tridecyl alcohol ethoxylates, which are sold commercially under the tradename Surfonic® TDA (e.g., Surfonic® TDA-8) by Huntsman Corp. Exemplary quantities of the hydrophilic agent incorporated into separator 402 include 1% to 5% of the weight of the separator.

The separator 402 may have a total tensile strength in the machine direction of, for example, 1 lbf/in or more, 5 lbf/in or more, 10 lbf/in or more, 15 lbf/in or more, 20 lbf/in or more, or 25 lbf/in or more, among other ranges of total tensile strengths. Additional exemplary total tensile strength ranges may be 1 lbf/in to 50 lbf/in (e.g., 4 lbf/in to 20 lbf/in). For example, a 3 inch wide sample of the separator 402 may have an exemplary total tensile strength of 10 lbf/3 in or more, 20 lbf/3 in or more, 30 lbf/3 in or more, 50 lbf/3 in or more, among other ranges of total tensile strengths. Additional exemplary normalized total tensile strength ranges may be 50 lbf/3 in to 150 lbf/3 in.

FIG. 4B shows a simplified diagram of an "envelope" type separator 410 according to embodiments of the invention. The separator 410 is shaped to wrap around an electrode assembly that includes a grid structure 412 pasted with an electrode active material 414. The grid structure includes a tab 416 that electrically couples the electrode to one of the terminals (not shown) of the battery. The separator 410 may be made from the same fiber-containing mat materials as described for separator 402 above. For example, the separator 410 may be made by folding over a sheet of the fiber-containing mat and sealing the opposite edges by, for example, stitching, binding, and/or melting them together. In another example, the separator 410 may be made by joining together two or more overlapping sheets of the fiber-containing mat. The sheets may be joined by, for example, stitching, binding, and/or melting them together.

In some examples, separator 410 may be placed over the positive electrode, while in additional examples separator 410 is placed over the negative electrode of the battery. The types and quantities of the one or more additives incorporated into the separator 410 may be determined based on whether the separator covers a positive electrode or a negative electrode. In additional embodiments, the one or more additives may be applied to the inside surface of separator 410 or the outside surface of the separator. In still further embodiments, different types and amounts of the one or more additives may be applied to the inside and outside surfaces.

Exemplary Lead-Acid Cell

Figure 5:
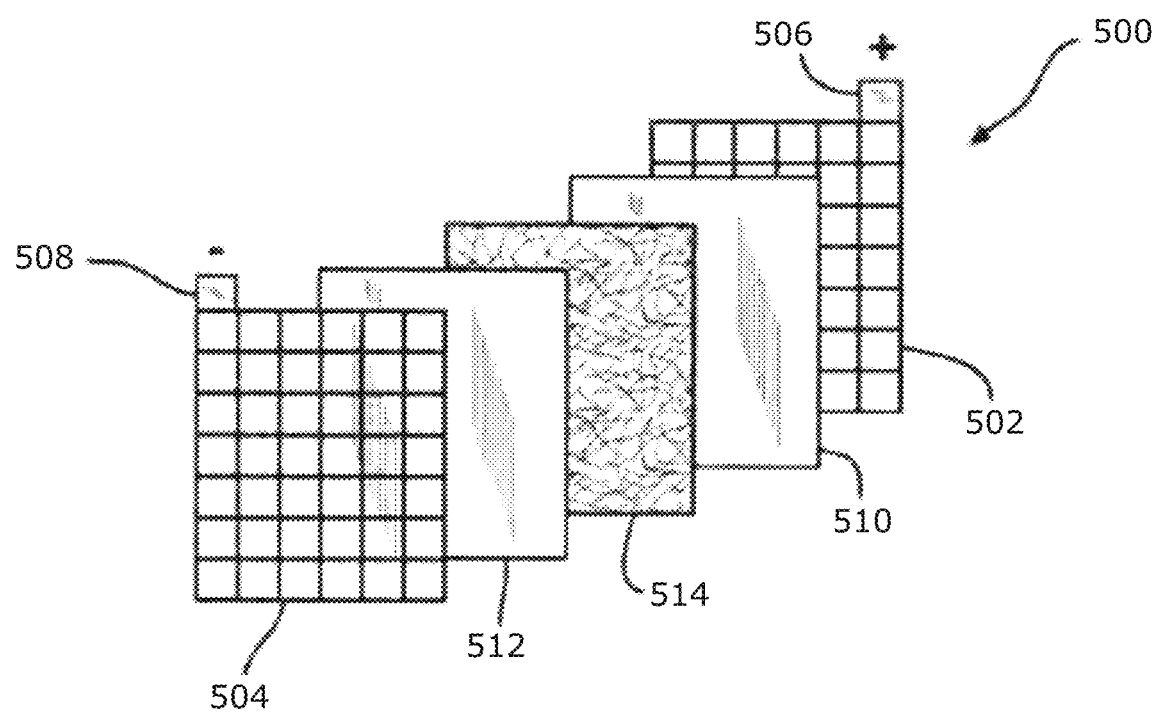
FIG. 5 is a simplified schematic of an exploded perspective view of a battery cell assembly according to embodiments of the invention.

FIG. 5 shows an exploded view of selected components of a lead acid cell 500. The lead-acid cell 500 can provide an electromotive force (emf) of about 2.1 volts and three such cells connected in series can make a lead-acid battery with an emf of about 6.3 volts. Lead acid-batteries with higher voltages may be obtained by connected more cells 500 in series. For example connecting six cells 500 in series can make a lead-acid battery with an emf of about 12.6 volts, and so on. The lead acid cell 500 may include a positive electrode 502, including positive active material (not shown) pasted on grid (shown), and a negative electrode 504, including negative active material (not shown) pasted on a grid (shown), that may be made from grid structures and electrode active materials described above. The positive electrode 502 may also include a positive tab 506 that is electrically coupled to a positive terminal (not shown) of the cell or battery and the negative electrode 504 may include a negative tab 508 that is electrically coupled to a negative terminal (not shown) of the cell or battery.

The lead acid cell 500 may also include at least one component made from the present fiber-containing mats that include the one or more additives. For example, the lead acid cell 500 may include a first pasting mat 510 in contact with the positive electrode 502, a second pasting mat 512 in contact with the negative electrode 508, and/or a separator 514 made from the present fiber-containing mats. In some embodiments, the lead acid cell 500 is an AGM lead acid cell, the separator 514 itself may be made from the present fiber-containing mat, and the mat may include glass fibers operable to absorb the cell electrolyte (e.g., an aqueous sulfuric acid electrolyte). In additional embodiments, the lead acid cell 500 is a flooded lead acid cell, and the separator 514 may be a sheet of material made from paper, rubber, or organic polymers that is in contact on one or more sides with one or more retainer/support mats made of the present fiber-containing mats. In an exemplary flooded lead acid cell, the one or more retainer/support mats may be made from glass fibers like an AGM separator, or they may be partially or entirely made from polymer fibers.

First pasting mat 510 may be impregnated or saturated with the positive electrode active material pasted on positive electrode 502 such that the first pasting mat 510 is partially or fully disposed within the positive electrode active material. Impregnation or saturation of the positive electrode active material within the first pasting mat 510 means that the active material penetrates at least partially into the first pasting mat. For example, first pasting mat 510 may be fully impregnated with the positive electrode active material so that the mat 510 is fully buried within the positive electrode active material (e.g., fully buried within the lead oxide paste). Fully burying the pasting mat 510 within the positive electrode active material means that the mat 510 is entirely disposed within the positive electrode active material. In examples, first pasting mat 510 may be disposed within the positive electrode active material up to about a depth "X" of about 20 mils (i.e., 0.020 inches) from an outer surface of the positive electrode 502. In other examples, the first pasting mat 510 may rest atop the positive electrode active material so that the mat 510 is impregnated with very little of the active material. Embodiments include the first pasting mat 510 being impregnated with the positive electrode active material such that the outer surface of the mat 510 forms or is substantially adjacent the outer surface of the positive electrode 502. In other words, the positive electrode active material may fully penetrate through the first pasting mat 510 such that the outer surface of the positive electrode 502 is a blend or mesh of the positive electrode active material and the fibers of the first pasting mat 510.

Similarly, the second pasting mat 512 is shown positioned adjacent to a surface of the negative electrode 504 may be arranged and/or coupled with the negative electrode in a configuration similar to that described above for the first pasting mat 510 with respect to the positive electrode 502. For example, the second pasting mat 512 may be disposed partially or fully over the surface of the negative electrode 504 so as to partially or fully cover the surface, or may be positioned on an inner surface of the negative electrode 504 (i.e., adjacent separator 514) instead of the shown outer surface configuration, and/or may be impregnated or saturated with the negative electrode active material such that the second pasting mat 512 is partially or fully disposed within the active material. Like the first pasting mat 510, the second pasting mat 512 may provide additional support to help reduce the negative effects of shedding particles of the negative electrode active material caused by repeated charge and discharge cycles of lead acid cell 500.

One or more of the fiber-containing mats may include electrically conductive materials that permit the mat to provide additional electrically conductive pathways to the tabs 506 and 508 of the lead acid cell 500. These electrically conductive materials may include electrically conductive fibers (e.g., graphite fibers, metal fibers, electrically-conductive polymer fibers, etc.) and/or electrically conductive particles (e.g., carbon black) incorporated into one or more of the fiber-containing mats. For example, the first and/or second pasting mats 510 and 512 may include a conductive material incorporated into the fiber-mat. This permits an additional electrical conduction pathway around the outer surface of the electrodes 502 and/or 504 to the electrode tabs 506 and 508, respectively. In additional examples, the one or more retainer/support mat components of separator 514 may include electrically conductive materials that create an additional electrical conduction path for electrons traversing the height of the positive and/or negative electrode 502 and 504, respectively. The separator 514 may also include an electrically insulating layer (e.g., a microporous sheet of electrically insulating material) that prevents direct electrical conduction between the positive and negative electrodes 502 and 504 that would create a short circuit inside the lead acid cell 500.

Exemplary Lead Acid Batteries

Figure 6:
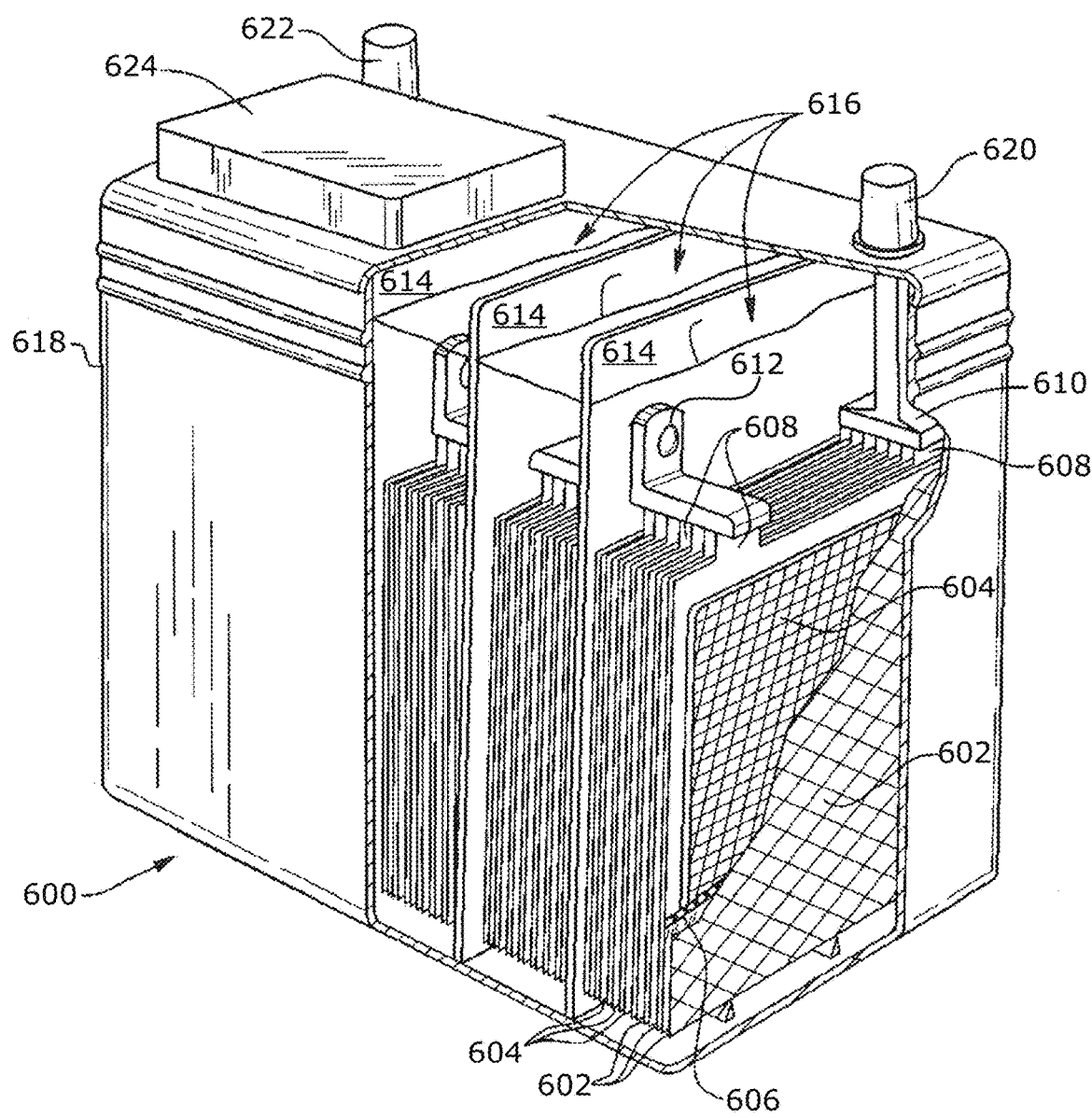
FIG. 6 is a simplified schematic of a lead acid battery according to embodiments of the invention.

FIG. 6 shows a cut-away view of an example of a flooded lead acid battery 600 that incorporates the present fiber-containing mats having one or more of the above-described additives. The battery 600 includes multiple lead-acid cells that include positive electrodes 602 and negative electrodes 604 that are electrically isolated from each other by separators 606 which may include one or more retainer/support mats. The positive and negative electrodes 602 and 604 include tabs 608 for the conduction of electrons between the electrodes and the battery's positive and negative terminals 620 and 622. The electrical connection between the tabs 608 and terminals 620 and 622 is made through connectors 610 and 612. In the embodiment shown, sub-groups of approximately six lead-acid cells are separated by partition walls 614 that prevent the seepage of the liquid electrolyte 616 between the partitioned subgroups of cells.

The lead acid cells and electrolyte are enclosed by the battery case 618 that keeps the electrolyte 616 from spilling out of the battery 600 as well as provides structural support for the partition wall 614, connectors 610 and 612, and terminals 620 and 622, among other components of the battery. The battery case 618 may be made from polymers that resist corrosion from the electrolyte (e.g., polypropylene and polycarbonate polymers). In the embodiment shown, battery 600 includes a cover 624 that conceals ports (not shown) that allow additional water to be added to the battery 600 as well as gases such as hydrogen and oxygen gas to vent from the battery. In alternate embodiments (not shown) such as AGM lead-acid batteries, the ports may be replaced by one-way valves that permit the venting of gases from the battery but do not allow water to be added to the battery.

The present fiber-containing mats that include one or more additives may be used in a variety of components for battery 600, including one or more of the pasting mats for the electrodes 602 and 604, and as retainer/support mats for the separators 606. Embodiments include a battery 600 with a pasting mat coupled to the positive electrode 602, the negative electrode 604, or both electrodes. Embodiments also include a battery 600 with the present fiber-containing mats as the retainer/support mats. Embodiments still further include a battery 600 with the present fiber-containing mats as pasting mats for either one or both of the electrodes 602 and 604, as well as the retainer/support mats of the separators 606. Embodiments yet further include an AGM battery 600 with the present fiber-containing mats as the separator.

Exemplary electrolyte 616 for the lead-acid battery 600 include an aqueous solution of sulfuric acid. For lead-acid batteries, the effectiveness of the electrolyte is commonly assessed by measuring its specific gravity. When the lead-acid battery 600 is in a fully-charged state, the specific gravity typically ranges from 1.260 to 1.300 g/cm$^3$ at 15° C. In a discharged state, the specific gravity drops to about 1.100 g/cm$^3$ as an increasing amount of the sulfate ions have moved from the electrolyte 616 to help form lead sulfate on the electrodes 602 and 604.

EXPERIMENTAL

Cathodic voltammetry measurements were taken on leachate samples made by contacting additive-containing fiber mats with aqueous sulfuric acid solutions that simulated an electrolyte in a lead-acid battery. In a first example, the fiber mat included a glycol ester additive while in the second example the fiber mat included a benzyl benzoate additive. In both examples, the cathodic voltammetry measurements showed that the additives are capable of suppressing hydrogen gas ($H_2(g)$) evolution and water loss from a lead-acid battery to a significantly greater extent than control samples of the sulfuric acid electrolyte that lack the additive.

Example 1

A non-woven glass mat (0.6 lb/sq, where "lb/sq" is equal to lb/(100 square feet)) was made with a wet-laid machine using acid resistant glass fiber (¾" K249 T from Johns Manville). The glass fibers had a nominal fiber diameter of 13 μm and a length of 1.9 cm. An alkyl acrylate binder (Rhoplex® HA-16 from Dow Chemical) was used to bind the glass fibers (Loss On Ignition (LOI) was 18 wt. %). A glycol ester (TegMeR® 812 from Hallstar) was added to the binder composition as the additive in an amount such that the solids ratio of the additive to the binder composition was 1%. Specifically, after preparing the Rhoplex® HA-16 binder with 20% solids, the TegMeR® 812 was added such that it was 0.2 wt. % in the binder composition to achieve the 1 wt. % solids ratio of additive/binder. It was assumed that a proportional addition of the additive to binder composition was applied to the non-woven glass mat to provide 0.18 wt. % of the additive on the mat (at 18% LOI). The combination of the non-woven glass mat and binder composition was then cured to form an exemplary fiber-containing mat with a glycol ester additive.

The hydrogen evolution potential of the above-described fiber-containing mat with the glycol ester additive was then compared with a control sample of the sulfuric acid electrolyte. The hydrogen evolution potential was tested using the established Electrochemical Compatibility (ECC) test as described in Battery Counsel International's Technical Manual BCIS-03A, Rev. September 09, for testing the effect of additives on the electrochemistry of $Pb/PbSO_4/PbO_2$ electrode systems. For the testing, approximately 5 grams of the additive-containing mat was leached with 100 ml of aqueous sulfuric acid at 70° C. for 7 days. The aqueous sulfuric acid had a specific gravity of 1.210 (about 28.9 wt. % $H_2SO_4$ in water). Some of the glycol ester additive was leached into the 100 ml sample of aqueous sulfuric acid.

Cathodic voltammetry scans were performed as follows: First, a 100 ml sample of sulfuric acid having a specific gravity of 1.210 (i.e., 28.9 wt. % $H_2SO_4$ in water) was added into the glass cell and a cathodic scan was performed (see plot labeled "Blank" in FIG. 7A). Next, a 10 ml dose of the leachate sample was added to the glass cell which already contained the 100 ml sulfuric acid sample, and another cathodic scan was performed (see plot labeled "Leachate" in FIG. 7A). The rotation rate of the scan was 1000 rpm with a scan rate of 3.33 mV/sec. The scan range was −700 mV to −1750 mV.

Figure 7A:
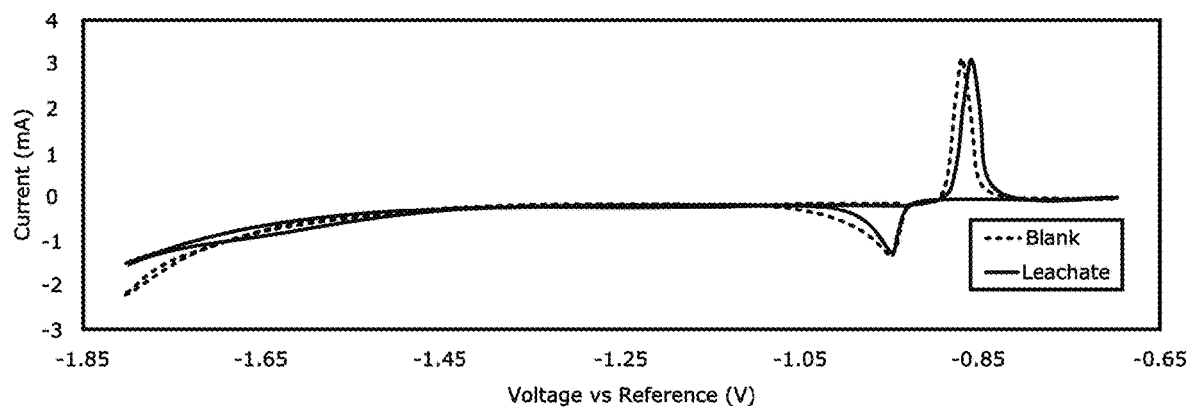
FIG. 7A shows a scan plot of current versus voltage difference for a glycol ester leachate and blank samples.

FIG. 7A shows the scan plot of current (in milliamps) versus voltage difference (in Volts) for the glycol ester Leachate and Blank samples. The plot shows the glycol ester additive (i.e., the Leachate) shifted the hydrogen evolution potential to a more negative value. Looking at the hydrogen evolution maximum current, leachate shows −1.4487 mA, a reduction of 34.2% from the Blank sample (−2.2005 mA). This demonstrates that the glycol ester additive suppressed hydrogen evolution and water consumption compared to the aqueous sulfuric acid blank. Thus, the glycol ester additive is effective for reducing water loss from a lead-acid battery.

Example 2

A non-woven glass mat (0.6 lb/sq) was made with a wet-laid machine using acid resistant glass fiber (¾" K249 T from Johns Manville). The glass fibers had a nominal fiber diameter of 13 μm and a length of 1.9 cm. An alkyl acrylate binder composition (Rhoplex® HA-16 from Dow Chemical) was used to bind the glass fibers (LOI 18 wt. %). Benzyl benzoate was added to the binder composition as the additive in an amount such that the solids ratio of the additive to the binder composition was 0.5%. It was assumed that a proportional addition of the additive to binder composition was applied to the non-woven glass mat to provide 0.09 wt. % of the additive on the mat. The combination of the non-woven glass mat and binder composition was then cured to form an exemplary fiber-containing mat with a glycol ester additive.

The hydrogen evolution potential of the above-described fiber-containing mat with the benzyl benzoate additive was then compared with a control sample of the sulfuric acid electrolyte. The hydrogen evolution potential was tested using the established Electrochemical Compatibility (ECC) test as described in Battery Counsel International's Technical Manual BCIS-03A, Rev. September 09. For the testing, approximately 5 grams of the additive-containing mat was leached with 100 ml of aqueous sulfuric acid at 70° C. for 7 days. The aqueous sulfuric acid had a specific gravity of 1.210 (about 28.9 wt. % $H_2SO_4$ in water). Some of the benzyl benzoate additive was leached into the 100 ml sample of aqueous sulfuric acid.

Cathodic voltammetry scans were performed as follows: First, a 100 ml sample of sulfuric acid having a specific gravity of 1.210 (i.e., 28.9 wt. % $H_2SO_4$ in water) was added into the glass cell and a cathodic scan was performed (see plot labeled "Blank" in FIG. 7B). Next, a 10 ml dose of the leachate sample was added to the glass cell which already contained the 100 ml sulfuric acid sample, and another cathodic scan was performed (see plot labeled "Leachate" in FIG. 7B). The rotation rate of the scan was 1000 rpm with a scan rate of 3.33 mV/sec. The scan range was −700 mV to −1750 mV.

Figure 7B:
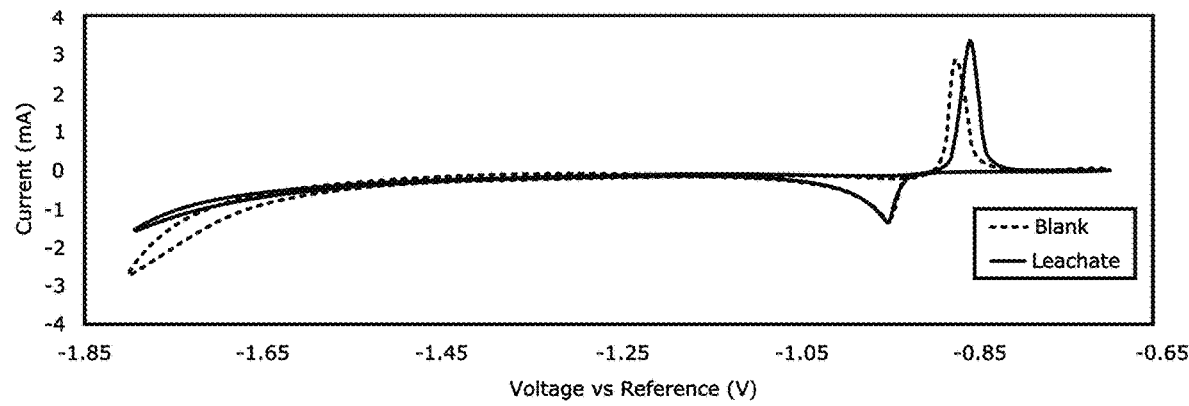
FIG. 7B shows a scan plot of current versus voltage difference for benzyl benzoate leachate and blank samples.

FIG. 7B shows the scan plot of current (in milliamps) versus voltage difference (in Volts) for the benzyl benzoate Leachate and Blank samples. The plot shows the benzyl benzoate additive (i.e., the Leachate) shifted the hydrogen evolution potential to a more negative value. Looking at the hydrogen evolution maximum current, leachate shows −1.5730 mA, a reduction of 41.9% from the Blank sample (−2.7065 mA). This demonstrates that the benzyl benzoate additive suppressed hydrogen evolution and water consumption compared to the aqueous sulfuric acid blank. Thus, the benzyl benzoate additive is effective for reducing water loss from a lead-acid battery.

The mats in Examples 1 and 2 can be used as pasting mat or PE separator support/retainer mat. For these applications, an exemplary weight range for the mat is 0.2-4.0 lb/sq, (e.g., 0.4-2.5 lb/sq). Exemplary LOIs for the mat may range from 5-50%, (e.g., a range from 12-35%). The additive (based on the mat weight) in this invention may be added to achieve 0.01-20% of the mat weight, (e.g., a range of 0.05-5%). In addition, the additives may be added into a typical AGM separator, which may be made of glass microfibers or a blend of glass microfibers and polymer fibers, so the additive is 0.01-20% of the mat weight (e.g., 0.05-5%). The additives can be leached out by sulfuric acid during the life of the battery and function to reduce water loss and/or provide others functions and benefits. Furthermore, the addition of the additives should not impact significantly on other mat properties, like tensile strength, air permeability, etc. and should not impact negatively on other battery properties, like capacity, CCA (cold cranking amperes), etc.

Example 3

We conducted Electrochemical Compatibility (ECC) tests by direct addition to evaluate the impact of TegMeR® 812 (from Hallstar). In this method, the quantity of the additive (e.g., TegMeR® 812) is known and can be changed easily. The hydrogen evolution potential of the glycol ester additive was compared with a control sample of the sulfuric acid electrolyte. The only difference from the method described in Example 1 and 2 is that a designated amount of the additive TegMeR® 812 is added instead of the leachate.

Cathodic voltammetry scans were performed as follows: First, a 100 ml sample of sulfuric acid (specific gravity of 1.210 or 28.9 wt. % $H_2SO_4$ in water) was added into the glass cell and a cathodic scan was performed (scanned curve labeled "Blank" in FIG. 8). Next, a 1 ml dose of the additive solution was added into the glass cell so the additive has the designated concentration, for example, 10 ppm. Then a cathodic scan was performed (scanned curve labeled "10 ppm" in FIG. 8). The rotation rate of the scan was 1000 rpm with a scan rate of 3.33 mV/sec. The scan range was −700 mV to −1850 mV.

Figure 8:
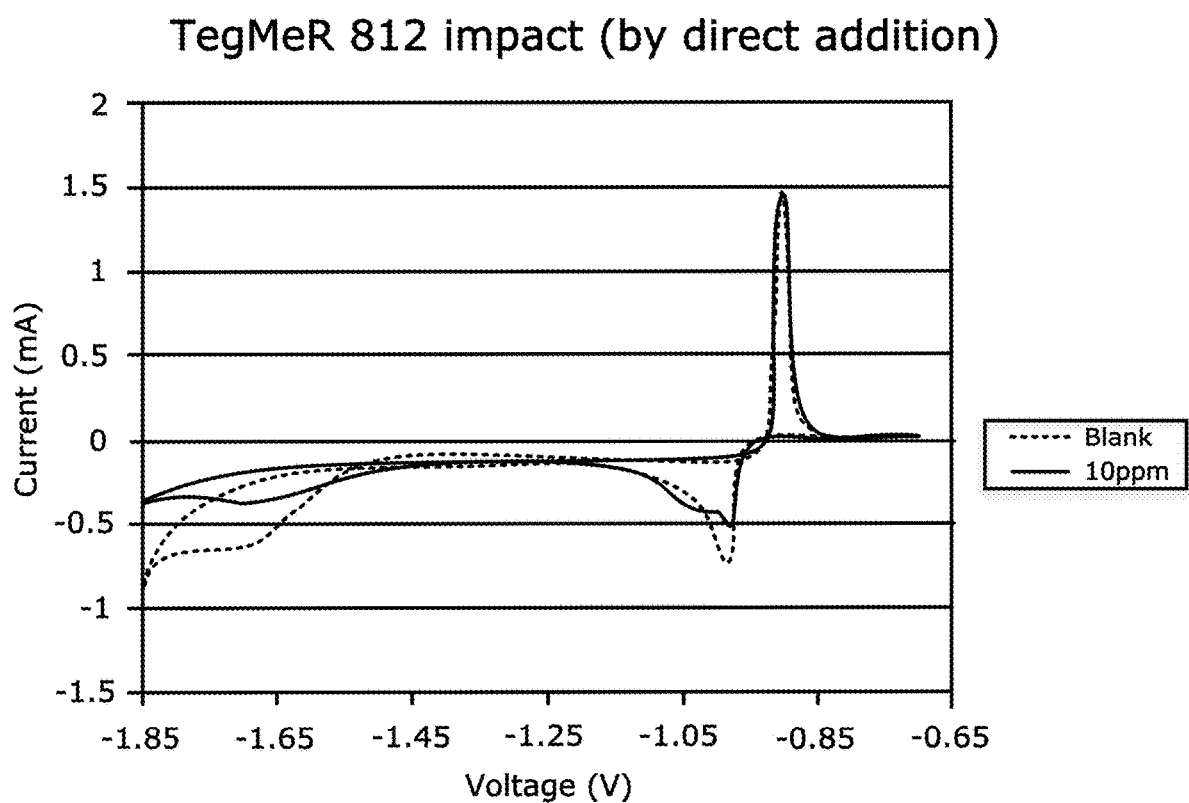
FIG. 8 shows a scan plot of current versus voltage difference in a ECC test for glycol ester additive and blank samples.

FIG. 8 shows the scan plot of current (in milliamps) versus voltage difference (in Volts) for the glycol ester additive and Blank samples. The plot shows the glycol ester additive (i.e., 10 ppm) shifted the hydrogen evolution potential to a more negative value. Looking at the hydrogen evolution maximum current at −1.85V, "10 ppm" shows −382.5 uA, a reduction of 57.3% from the Blank sample (−894.9 uA). This demonstrates that the glycol ester additive suppressed hydrogen evolution and reduced water consumption compared to the aqueous sulfuric acid Blank. Thus, the glycol ester additive is effective for reducing water loss for a lead-acid battery.

Example 4

Figure 9:
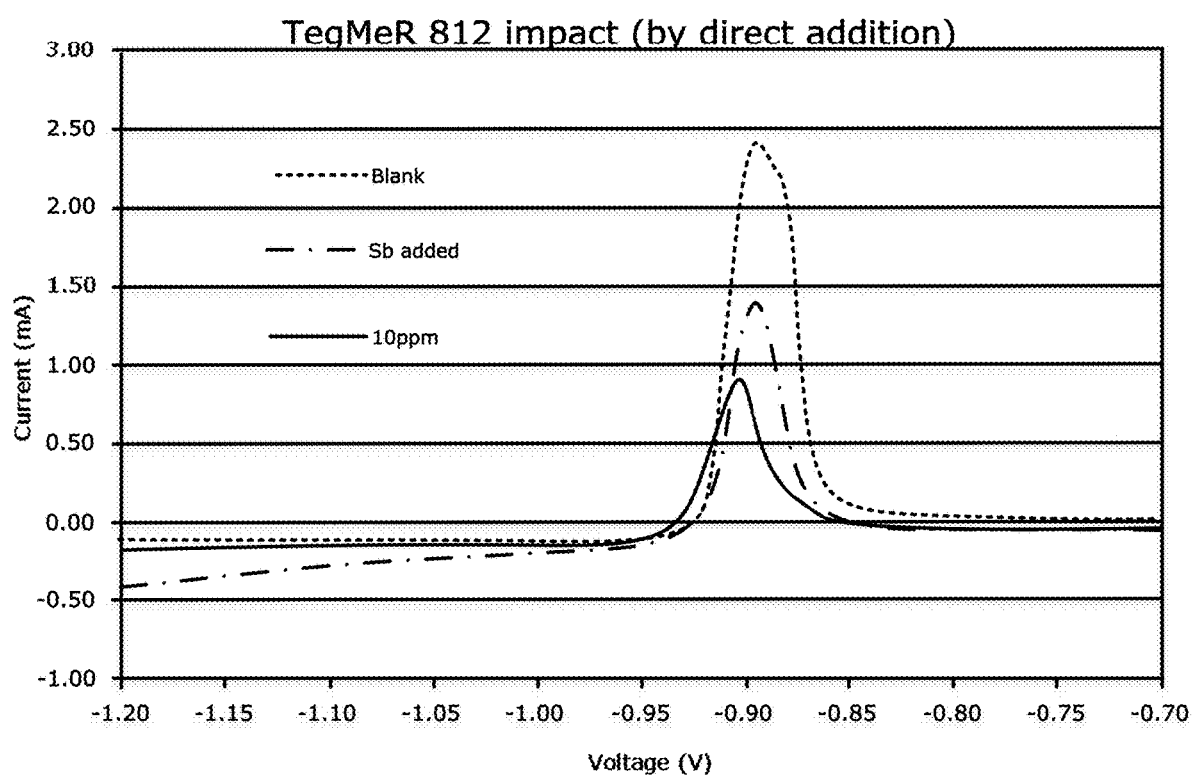
FIG. 9 shows a scan plot of current versus voltage difference in an antimony suppression test for glycol ester additive, Sb added, and blank samples.

An antimony suppression test (AST) was conducted according to the procedure described in Böhnstedt, W.; Radel, C.; Scholten, F. "Antimony poisoning in lead-acid batteries", Journal of Power Sources, Volume 19, Issue 4, p. 307-314. The AST is a test to check the impact of an additive on hydrogen evolution when antimony (Sb) is present. This is the case for most deep cycle batteries, where antimony is added in the plates to increase the cycle life of the battery. However, water loss increases significantly due to the addition of antimony, and it is a goal to reduce the hydrolytic water loss in lead-acid batteries due to the presence of antimony. The AST test procedure includes three linear scans −1200 to −700 mV after 15 min. maintained at −1200 mV. The first scan is Blank (100 mL electrolyzed 1.21 sg $H_2SO_4$) scan. The second scan is with addition of Antimony (1 mL of 1000 ppm Sb added into 100 mL of $H_2SO_4$, so the Sb level is ~10 ppm). The third scan is with addition of the additive, for example, TegMeR® 812. All three scans are plotted as shown in FIG. 9.

Selectivity is calculated from peak $H_2$ current and discharge capacities for the scans with Sb and with Sb plus additive according the equation:

$$\text{Selectivity} = \frac{(H2 \text{ current with Sb})/(H2 \text{ current with additive})}{(\text{Capacity with additive})/(\text{capacity of blank})}$$

A larger selectivity indicates better performance in terms of water reduction. The selectivity is calculated to be ~2.38. This is significantly larger than 1 and indicates that the addition of TegMeR® 812 helps reduce water loss in the presence of antimony as well. Combining Examples 1 and 4, TegMeR® 812 is shown to be effective to reduce water loss with and without the presence of antimony, suggesting that the additive is effective in various applications, such as automobile and deep cycle applications.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the additive" includes reference to one or more additives and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A lead acid battery comprising:
   a positive electrode comprising lead oxide;
   a negative electrode comprising a lead alloy;
   a separator that electrically insulates the negative electrode from the positive electrode;
   one or more pasting mats comprising a positive electrode pasting mat and in contact with at least one of the positive electrode and the negative electrode, and wherein the positive electrode pasting mat comprises:
   a plurality of fibers; and
   a binder; and
   an additive comprising benzyl benzoate incorporated onto the plurality of fibers or into the binder.

2. The lead acid battery of claim 1, wherein the one or more pasting mats further comprise:
   a negative electrode pasting mat in contact with the negative electrode; and wherein the positive electrode pasting mat in contact with the positive electrode.

3. The lead acid battery of claim 1, wherein the additive is incorporated directly onto the plurality of fibers though a sizing composition that is applied to the plurality of fibers.

4. The lead acid battery of claim 1, wherein the additive is incorporated into the binder through a binder composition that includes the additive.

5. The lead acid battery of claim 4, wherein the additive is reversibly reacted with the binder, and wherein the additive is released into an electrolyte during operation of the lead acid battery.

6. The lead acid battery of claim 1, wherein the plurality of fibers comprises at least one type of fiber selected from the group consisting of glass fibers, polyester fibers, polyolefin fibers, nylon fibers, aramid fibers, poly(phenylene sulfide) fibers, and carbon fibers.

7. The lead acid battery of claim 1, wherein the binder comprises at least one binder that is selected from the group consisting of an acrylic binder, a styrene acrylonitrile binder, a styrene butadiene rubber binder, a urea formaldehyde binder, an epoxy binder, a polyurethane binder, a phenolic binder, and a polyester binder.

8. The lead acid battery of claim 1, wherein the one or more pasting mats further comprise a negative electrode pasting mat, and wherein the negative electrode pasting mat comprises:
a plurality of fibers; and
a binder.

9. The lead acid battery of claim 8, wherein the additive is incorporated directly onto the plurality of fibers though a sizing composition that is applied to the plurality of fibers.

10. The lead acid battery of claim 8, wherein the additive is incorporated into the binder through a binder composition that includes the additive.

11. The lead acid battery of claim 10, wherein the additive is reversibly reacted with the binder, and wherein the additive is released into an electrolyte during operation of the lead acid battery.

12. The lead acid battery of claim 8, wherein the plurality of fibers comprises at least one type of fiber selected from the group consisting of glass fibers, polyester fibers, polyolefin fibers, nylon fibers, aramid fibers, poly(phenylene sulfide) fibers, and carbon fibers.

13. The lead acid battery of claim 8, wherein the binder comprises at least one binder that is selected from the group consisting of an acrylic binder, a styrene acrylonitrile binder, a styrene butadiene rubber binder, a urea formaldehyde binder, an epoxy binder, a polyurethane binder, a phenolic binder, and a polyester binder.

14. The lead acid battery of claim 1, wherein the separator comprises a plurality of fibers.

15. The lead acid battery of claim 14, wherein the additive is incorporated into the separator.

16. The lead acid battery of claim 14, wherein the plurality of fibers comprises at least one type of fiber selected from the group consisting of glass fibers, polyester fibers, polyolefin fibers, nylon fibers, aramid fibers, poly(phenylene sulfide) fibers, and carbon fibers.

17. The lead acid battery of claim 14, wherein the additive is incorporated directly onto the plurality of fibers though a sizing composition that is applied to the plurality of fibers.

18. The lead acid battery of claim 14, wherein the separator further comprises a binder.

19. The lead acid battery of claim 18, wherein the additive is reversibly reacted with the binder, and wherein the additive is released into an electrolyte during operation of the lead acid battery.

20. The lead acid battery of claim 14, wherein the additive is incorporated into the binder through a binder composition that includes the additive.

21. The lead acid battery of claim 1, wherein the separator is an absorbent-glass-mat separator for the lead acid battery.

22. The lead acid battery of claim 1, wherein the separator comprises a porous membrane, and wherein the lead acid battery comprises an aqueous liquid electrolyte comprising sulfuric acid.

23. The lead acid battery of claim 1, wherein lead acid battery comprises a retainer/support mat in contact with the separator, and wherein the additive is incorporated into the retainer/support mat.

24. A lead acid battery comprising:
a positive electrode comprising lead oxide;
a negative electrode comprising a lead alloy;
a separator that electrically insulates the negative electrode from the positive electrode;
one or more pasting mats in contact with at least one of the positive electrode and the negative electrode; and
an additive benzyl benzoate,
wherein at least one of the separator and the one or more pasting mats comprise a fiber-containing mat comprising
a plurality of fibers, and
a binder holding the plurality of fibers together in the fiber-containing mat,
and wherein the additive is incorporated into the fiber-containing mat.

25. The lead acid battery of claim 24, wherein the additive is incorporated into the plurality of fibers of the fiber-containing mat.

26. The lead acid battery of claim 24, wherein the additive is incorporated into the binder of the fiber-containing mat.

27. The lead acid battery of claim 24, wherein the separator comprises the fiber-containing mat.

28. The lead acid battery of claim 24, wherein the one or more pasting mats comprise the fiber-containing mat.

29. The lead acid battery of claim 24, wherein the additive further comprises a glycol ester.

* * * * *